United States Patent [19]
Grossa

[11] Patent Number: 5,236,326
[45] Date of Patent: Aug. 17, 1993

[54] SOLID IMAGING SYSTEM USING PHOTOHARDENING INHIBITION

[75] Inventor: Mario Grossa, Dreieich, Fed. Rep. of Germany

[73] Assignee: E. I Du Pont de Nemours and Company, Wilmington, Del.

[21] Appl. No.: 925,622

[22] Filed: Aug. 6, 1992

Related U.S. Application Data

[62] Division of Ser. No. 562,912, Jul. 5, 1990, Pat. No. 5,175,077.

[51] Int. Cl.⁵ .................................................. B29C 35/08
[52] U.S. Cl. .................................. 425/174.4; 118/620
[58] Field of Search .................. 425/174, 174.4, 162; 264/22; 427/54.1, 53.1, 55, 508, 510, 521; 522/2; 430/327, 13, 271, 333, 269, 394, 396, 15, 17, 527, 917; 118/620, 641

[56] References Cited

U.S. PATENT DOCUMENTS

| | | | |
|---|---|---|---|
| 2,775,758 | 12/1956 | Munz | 342/179 |
| 4,050,942 | 9/1977 | Nacci | 430/288 |
| 4,180,403 | 12/1979 | Nacci et al. | 430/281 |
| 4,575,330 | 3/1986 | Hull | 425/174.4 |
| 4,752,498 | 6/1988 | Fudim | 427/54.1 |
| 5,002,854 | 3/1991 | Fan et al. | 425/174.4 X |
| 5,002,855 | 3/1991 | Fan et al. | 425/174.4 X |
| 5,011,635 | 4/1991 | Murphy et al. | 425/174.4 X |
| 5,143,817 | 9/1992 | Lawton et al. | 425/174.4 X |

FOREIGN PATENT DOCUMENTS 0250121 12/1987 European Pat. Off. .

OTHER PUBLICATIONS

Automatic method for fabricating a three-dimensional plastic model with photo-hardening polymer, Hideo Kodama, Rev. Sci. Instrum. 52(11), Nov. 1981, pp. 1770–1773.
A Review of 3D Solid Object Generation, A. J. Herbert, 1989, SPSE—The Society for Imaging Science and Technology, pp. 186–190.
Solid Object Generation, Alan J. Herbert, 1982, Society of Photographic Scientists and Engineers, pp. 185–188.

Primary Examiner—Richard L. Chiesa
Attorney, Agent, or Firm—Thomas H. Magee

[57] ABSTRACT

An imaging apparatus produces a film of photohardened composition by exposing a layer of photohardenable composition to actinic radiation through a surface of a barrier transparent to the radiation and in contact with the composition at an interface therewith. An inhibition layer is created within the photohardenable composition in contact with the interface that inhibits photohardening of the composition within the inhibition layer during exposure, thereby precluding adhesion of any photohardened composition to the barrier.

6 Claims, 4 Drawing Sheets

SOLID IMAGING SYSTEM USING PHOTOHARDENING INHIBITION

This is a division of application Ser. No. 07/562,912, filed Jul. 5, 1990, now U.S. Pat. No. 5,175,077.

BACKGROUND OF THE INVENTION

1. Field of the Invention

The present invention is directed to an apparatus for forming a film through a transparent barrier in contact with a photohardenable composition in a manner that the film does not adhere to the barrier. It also pertains to an apparatus for fabricating an integral three-dimensional object from a multiplicity of cross sectional portions of the object through a transparent barrier in a manner that the cross sectional portions do not adhere to the barrier.

2. Description of Related Art

There are many systems known by which a film can be made. These include extrusion, drawing from a molten mass, casting, or spraying, or otherwise depositing a usually liquid film on a release substrate, solidifying the liquid film by decreasing the temperature, or by evaporating solvents contained in the film, or by other appropriate methods, and then separating the solidified film, and the like. The methods based on depositing a liquid film on a release substrate, and then separating the resulting solidified film are of particular interest because they require inexpensive equipment and they are simpler and easier to carry out. However, they have the disadvantage that the substrate cannot provide adequate release unless its surface tension is very low, which in turn makes difficult the film deposition without creation of defects, such as fish-eyes, craters, and the like, well known in the art of coatings and films.

In the area of Solid Imaging, many systems for production of three-dimensional modeling by photohardening have been proposed. European Patent Application No. 250,121 filed by Scitex Corporation Ltd., on Jun. 5, 1987, discloses a three-dimensional modeling apparatus using a solidifiable liquid, and provides a good summary of documents pertinent to this art. U.S. Pat. No. 4,575,330, issued to C. W. Hull on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction. Successive adjacent laminae, representing corresponding successive adjacent cross-sections of the object, are automatically formed and integrated together to provide a step-wise laminar buildup of the desired object, whereby a three-dimensional object is formed and drawn from a substantially planar surface of the fluid medium during the forming process. U.S. Pat. No. 4,752,498, issued to E. V. Fudim on Jun. 21, 1988, describes an improved method of forming three-dimensional objects, which comprises irradiating an uncured photopolymer by transmitting an effective amount of photopolymer solidifying radiation through a radiation transmitting material which is in contact with the uncured liquid photopolymer. The transmitting material is a material which leaves the irradiated surface capable of further crosslinking so that when subsequent layer is formed it will adhere thereto. Using this method, multilayer objects can be made. U.S. Pat. No. 4,801,477, issued also To Fudim on Jan. 31, 1989, mention is made of a light guide, which maybe made of material containing copper, oxygen, or other ingredients that may inhibit photopolymer cross linking.

A publication entitled "Automatic Method for fabricating a three-dimensional plastic model with photohardening polymer" by Hideo Kodama, Rev. Sci. Instrum. 52(11), 1770–1773, Nov. 1981, describes a method for automatic fabrication of a three-dimensional plastic model. The solid model is fabricated by exposing liquid photohardening polymer to ultraviolet rays, and stacking the cross-sectional solidified layers. A publication entitled "Solid Object Generation" by Alan J. Herbert, Journal of Applied Photographic Engineering, 8(4), 185–188, Aug. 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory. A good review of the different methods is also given by a most recent publication entitled "A review of 3D Solid Object Generation" by A. J. Herbert, Journal of Imaging Technology 15: 186–190 (1989).

Most of these approaches relate to the formation of solid sectors of three-dimensional objects in steps by sequential irradiation of areas or volumes sought to be solidified. Various masking techniques are described as well as the use of direct laser writing, i.e., exposing a photohardenable composition with a laser beam according to a desired pattern and building a three-dimensional model, layer by layer. In addition to various exposure techniques, several methods of creating thin liquid layers are described which allow both coating a platform initially and coating successive layers previously exposed and solidified.

The aforementioned methods of coating, however, are not capable of ensuring flat uniform layer thickness or of producing such layers quickly, or they do not effectively prevent damage or distortion to previously formed layers during the successive coating process and they involve coating only liquid formulations of preferably low viscosity. Furthermore, they omit to recognize very important parameters involved in the coating process such as the effects of having both solid and liquid regions present during the formation of the thin liquid layers, the effects of fluid flow and rheological characteristics of the liquid, the tendency for thin photohardened layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example, describes a dipping process where a platform is dipped below the distance of one layer in a vat, then brought up to within one layer thickness of the surface of the photohardenable liquid. Hull further suggests that low viscosity liquids are preferable but, for other practical reasons, the photohardenable liquids are generally high viscosity liquids. Motion of the platform and parts, which have cantilevered or beam regions (unsupported in the Z direction by previous layer sections) within the liquid, creates deflections in the layers, contributing to a lack of tolerance in the finished part. In addition, this method is rather slow.

U.S. Pat. No. 2,775,758, issued to O. J. Munz on Dec. 25, 1956, and the Scitex application describe methods by which the photohardenable liquid is introduced into a vat by means of a pump or similar apparatus such that the new liquid level surface forms in one layer thickness over the previously exposed layers. Such methods have the aforementioned disadvantages of the Hull method except that the deflection of the layers during coating is reduced.

The patent issued to Fudim describes the use of a transmitting material to fix the surface of a photopolymer liquid to a desired shape, assumably flat, through which photopolymers of desired thickness are solidified. The transmitting material is usually rigid and either coated or inherently non-adherent to the solidified photopolymer. The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds, vacuum forces, and the like are still present and in some cases substantial enough to cause damage or distortion to the photopolymer during removal from the transmitting material surface.

The present invention provides an apparatus for forming a film through a transparent barrier in contact with a photohardenable composition in a manner that the film does not adhere to the barrier, due to thermal or photo- formation of a liquid layer between the transparent barrier and the photohardened film. It further provides an apparatus for fabricating integral three-dimensional objects from a multiplicity of cross sectional portions of the object, corresponding to photohardened portions of successive individual layers of a photohardenable composition.

SUMMARY OF THE INVENTION

The present invention comprises an imaging apparatus for forming a film of photohardened composition by exposing a layer of photohardenable composition to actinic radiation through a surface of a barrier transparent to the radiation and in contact with the composition at an interface therewith. An inhibition layer is created within the photohardenable composition in contact with the interface that inhibits photohardening of the composition within the inhibition layer during exposure, thereby precluding adhesion of any photohardened composition to the barrier.

DETAILED DESCRIPTION OF THE PREFERRED EMBODIMENTS

The present invention is directed to an apparatus for forming a film through a transparent barrier in contact with a photohardenable composition in a manner that the film does not adhere to the barrier. This is achieved by forming a photohardening inhibition layer adjacent to the interface between the barrier and the composition. The present invention, base on these techniques, further provides a method and apparatus for fabricating integral three-dimensional objects from a multiplicity of cross sectional portions of the object, corresponding to photohardened portions of successive individual layers of a photohardenable composition. It is desirable that this inhibition layer is considerably thinner than the film or photohardened layer, but still thick enough for easy separation. Thus, it should be preferably thinner than 30%, and even more preferably less than 15% of the thickness of the film or photohardened layer.

In the preferred embodiments of this invention, the inhibition layer is formed by reversible inhibitors of photohardening present in the photohardenable composition, which inhibitors may be activated by radiation in a thin layer adjacent to the interface of the barrier and the photohardenable composition. Activation of the inhibitor, producing the liquid inhibition layer, precludes adhesion of any photohardened layers of the composition to the barrier.

For all practical purposes, it is important that where is an ample abundance of a source, which can result in the formation of the inhibition layer, so that depletion does not become a problem after repeated performance of this operation.

The present invention, based on these techniques, further provides a method and apparatus for fabricating integral three-dimensional objects from a multiplicity of cross sectional portions of the object, corresponding to photohardened portions of successive individual layers of a photohardenable composition.

Figure 1:
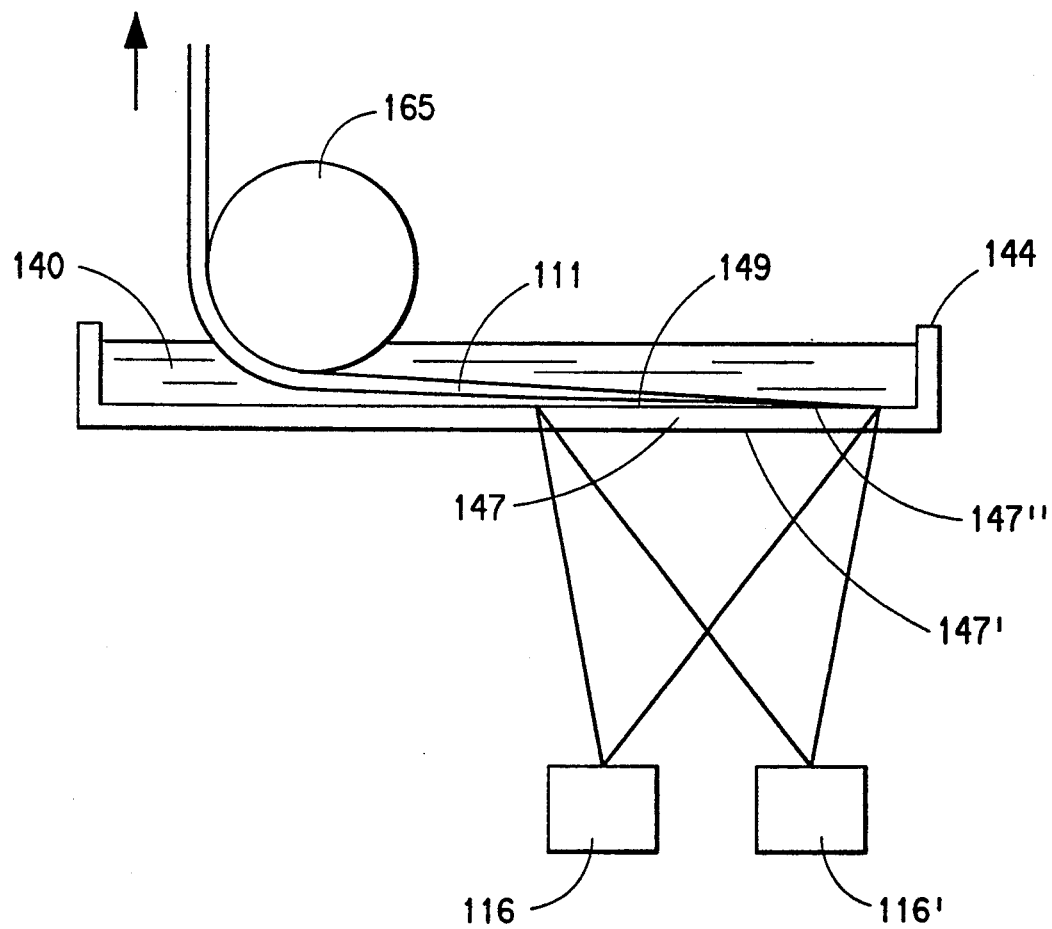
FIG. 1 is an elevation view showing a preferred embodiment of this invention.

FIG. 1 illustrates a preferred embodiment of this invention. There is provided a vessel 144 for containing a photohardenable composition 140 containing an inhibitor of photohardening. The vessel 144 has at the bottom a transparent area or barrier 147, which in turn has an external surface 147' and internal surface 147''. The internal surface 147'' is actually an interface between the barrier 144 and the photohardenable composition 140. There are also provided a first and a second exposure elements 116 and 116', respectively, for exposing the photohardenable composition to actinic radiation through the transparent barrier 147, and form a film 111, which does not adhere to the interface or internal surface 147'' of the barrier 147 as explained hereinbelow. A drum 165 is also provided to guide the film away from the composition, to a reel (not shown) for winding and storing. Before winding the film on the reel, wiping of excess composition from the surfaces of the film, and/or additional exposure to actinic radiation from the side off one or both surfaces of the film may be also desirable.

In operation of this embodiment, the photohardenable composition 140, in addition to a monomer or oligomer and a photoinitiator, should also comprise an inhibitor of photohardening which may be activated by actinic radiation having a wavelength different than the wavelength required for photohardening of the composition. Exposure elements 116 and 116' are designed to provide these two actinic radiations of different wavelengths. The first exposure element 116 provides the actinic radiation required for photohardening the composition 140, while the second exposure element 116' provides the radiation required to activate the inhibitor. According to this embodiment, where a continuous film is to be photoformed, it may be practical to combine the two exposure elements 116 and 116' into one source producing radiation of the appropriate wavelengths at reasonable intensities, for example a mercury arc lamp, or a Xenon lamp. However, for purposes of simplicity, and better understanding of the invention, it is more convenient to consider the two radiations of different wavelengths as provided by different exposure elements. In addition, two separate sources enable the operator to control independently the intensities of the two wavelengths, which in turn gives broader freedom in formulating the photohardenable composition.

The intensity of radiation supplied by the first exposure element 116 should be at such level as to provide the desired thickness of the film, depending on the characteristics of the photohardenable composition.

Similarly, the intensity of radiation supplied by the second exposure element 116' should be at such level, and the relative amount of the inhibitor in the composition high enough as to provide the desired thickness of inhibition layer 149, when the two are combined together. This inhibition layer must prevent photohardening of the composition within it, and it should be thick enough for the photohardenable composition within it to preserve its rheological properties as a liquid so that the film slides easily on it. These conditions preclude adhesion of any photohardened composition to the barrier 147. At the same time, however, the inhibition layer should be as thin as possible so that it will not interfere with the whole operation. Preferably, it should be thinner than 30%, and more preferably thinner than 10% of the film thickness, as long as the aforementioned conditions are also observed.

Preferable inhibitors are reversible inhibitors as explained at a later section.

The two exposure elements are arranged to provide their respective radiations simultaneously and continually, increasing the thickness of the film from right to left in FIG. 1, while the film at its final thickness is continually pulled around drum 165 and is wound on a reel (not shown). In a similar manner, the film may be moved in a direction substantially parallel to the interface 147" so that a new layer of a photohardenable composition adjacent to the interface may be formed. Repeating the creating of the inhibition layer by exposing the composition with element 116', and exposing with element 116, a new film juxtaposed with the previously exposed film is fabricated, resulting in formation of a continuous film 111 of photohardened composition.

Figure 2:
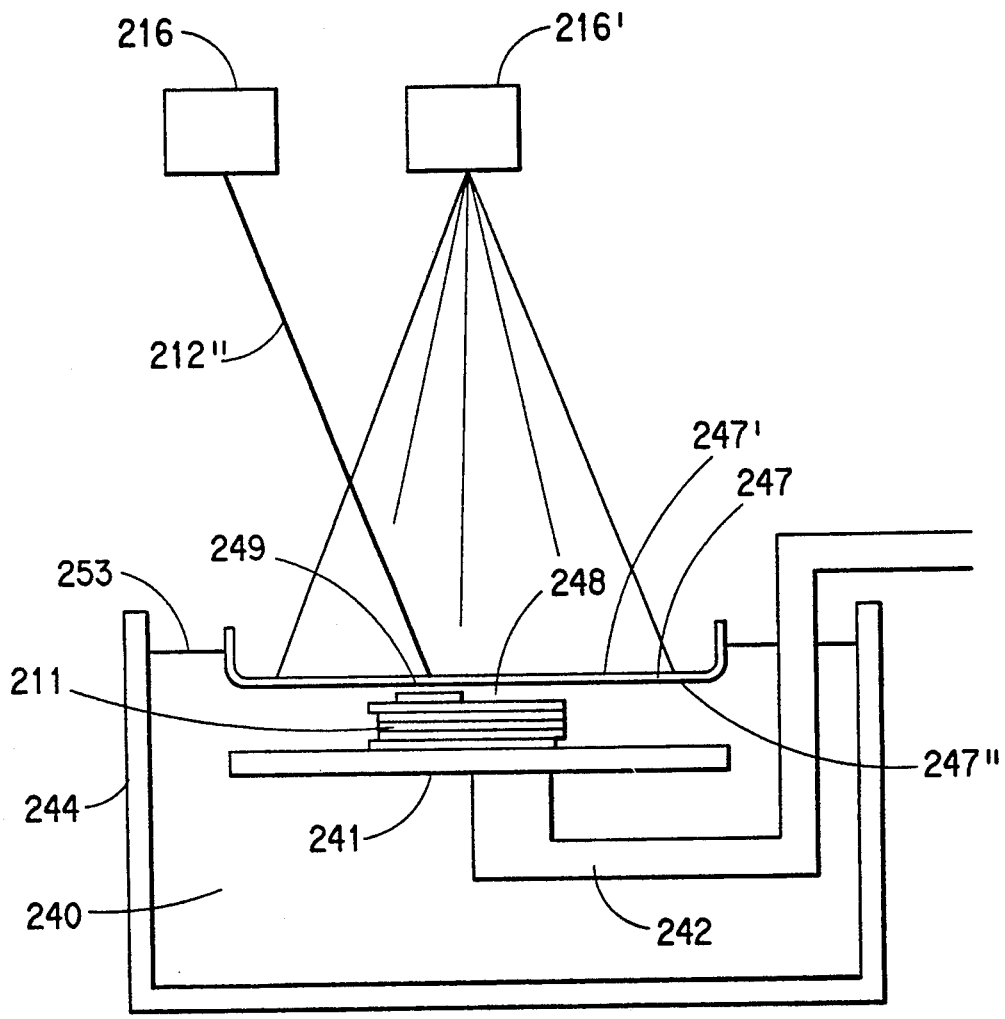
FIG. 2 is an elevation view showing the transparent barrier in an alternate preferred embodiment of the present invention.

FIG. 2 illustrates an apparatus of a different preferred embodiment. Again, there is provided a vessel 244 for containing the photohardenable composition 240. There is also provided a transparent plate or barrier 247 in contact with the composition 240, the barrier and the composition forming an interface 247" coinciding with the internal surface of the plate or barrier. The barrier has also an external surface 247', which is preferably parallel to the interface 247". A platform 241 is also provided within the vessel, disposed under the plate 247. The platform 241 is supported on placement means 242 so that the platform may be lowered away from the plate or barrier 247. On top of the vessel, there is provided a first exposure element 216, which preferably is a scanner and provides radiation in the form of a laser beam 212", corresponding to radiation having a wavelength suitable to induce photohardening of the photohardenable composition 240. There is also provided a second exposure element 216', which may supply radiation of suitable wavelength to activate a photoactivatable inhibitor of photohardening contained in the composition 240. Although the second exposure element is shown here as one providing flood exposure, a scanner or other type of locally irradiating source may be used. As a matter of fact, locally irradiating or flood sources may be used in any of the embodiments described herein according to the needs of the application. It is only important that the arrangement is such as to provide an inhibition layer between the photohardened layer and the transparent barrier.

In operation of this embodiment, the platform 241 is initially placed at a distance corresponding approximately to the thickness of a photohardened layer 211. The second exposure element is turned on to form an inhibition layer 249 as described in the previous embodiment. Simultaneously, the laser beam 212" is scanned in order to form a photohardened layer 211, which is separated from the transparent barrier 247 by the inhibition layer 249. The radiation provided by the first exposure element 216 has to be high enough so that the photohardened layer 211 adheres to the platform 241. In sequence, the platform 241 is moved by placement means 242 away from the transparent plate or barrier 247 by the thickness of a photohardened layer 211. This position of the platform may be received directly or by moving the platform 241 by an excess amount and then returning it to the desired position. If desired, the transparent plate or barrier 247 may be slided away first parallel to the platform, the platform lowered by the thickness of a photohardened layer, and the barrier moved back to its initial position. This more complex movement may be desirable in case the photohardenable composition is too viscous, or the photohardened layers too thin, or the photohardened areas too large, or a combination thereof, benefiting from such as complex movement with respect to gaining operation time, or otherwise. The same steps are repeated until all photohardened layers needed have been formed.

Figure 3:
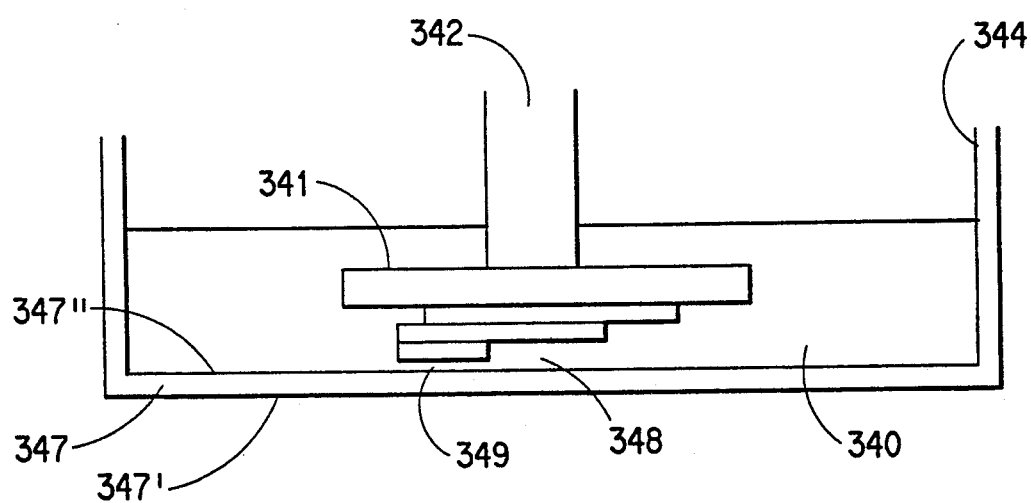
FIG. 3 is an elevation view showing still different embodiment of the present invention.

FIG. 3 shows an arrangement utilized in the case of a different embodiment of the present invention, where again there is provided a vessel 344 for containing a photohardenable composition 340. The bottom 347 of the vessel 344 is transparent and presents an interface 347" with the photohardenable composition 340. A platform 341 supported by placement means 342 is directly above the transparent bottom or barrier 347.

The operation of this embodiment is very similar to the previously described embodiment of FIG. 2, except that the components of the apparatus are in an upside-down position.

Figure 4:
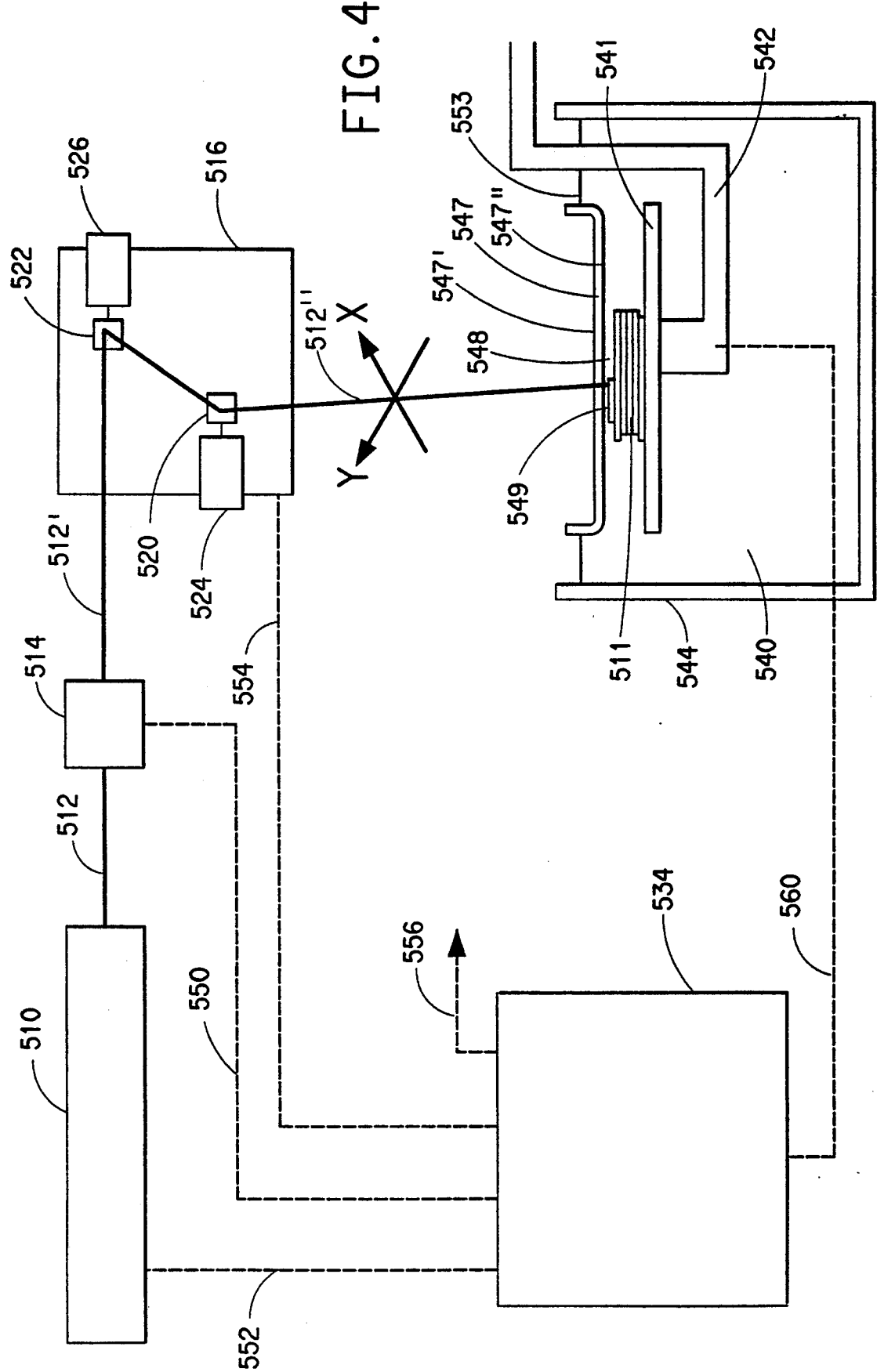
FIG. 4 is a schematic diagram showing a solid imaging apparatus according to the present invention.

FIG. 4 illustrates still another embodiment of this invention, which is directed to a solid imaging method and apparatus for fabricating an integral three-dimensional object from a multiplicity of cross sectional portions of the object. More particularly, the cross sectional portions correspond to solidified portions of contiguous layers of a photohardenable composition. A radiation source 510, preferably a laser, produces a radiation beam 512. In order to produce solid objects at high speed, the apparatus preferably utilizes relatively high power radiation sources 510, such as high power lasers. For present photospeeds of photohardenable compositions, high power is considered to be a power greater than 20 mW, and preferably over 100 mW as measured from the intensity of the radiation beam 12. However, as faster compositions become available, the values of 20 mW and 100 mW for the beam intensity will become lower accordingly, since photospeed of the composition and intensity of the radiation beam have an inverse relation to each other in order to achieve the same results. The selection of a certain type of laser should be coordinate with the selection of the photohardenable composition in a way that the sensitivity of the photohardenable composition agrees reasonably well with the wave length of the laser's emission. It should also be selected with the wavelength at which the inhibitor of photohardening absorbs or is activated in mind, so that no unwanted interference between the steps of photohardening and photoinhibition will occur. Other types of radiation means may also be utilized such as electron beams, x-rays, and the like, as long as their energy type is matched with the sensitivity of the photohardenable composition, a beam is provided, and the appropriate conditions for their handling are observed according to established ways, well known in the art. Although means may be provided to modify the shape of the beam cross-section to any desirable shape, the ordinary shape is circular, and the profile of the intensity of the beam is gaussian with a maximum at the center of the circular shape.

The radiation beam 512 passes through a modular 514, preferably an acousto-optical modulator. The modulated radiation beam 512′ passes in turn through a first exposure element or scanner 516, which comprises two mirrors 520 and 522, each mirror having an axis (not shown) allowing reflection of the beam to a free surface 553 in X and Y directions, the X and Y directions being perpendicular to each other and parallel to the free surface 553. The mirrors 520 and 522 may rotatably move around their corresponding axes by means of motors 524 and 526, respectively, for controllably deflecting the beam in a vector scanning mode, in the X and Y directions, towards predetermined positions of a photohardenable composition 540 contained in a vessel 544. As the beam is deflected by the first exposure element or scanner 516, it assumes an acceleration from zero level to a maximum acceleration, and a velocity from zero level to a maximum constant velocity. The velocity and intensity of the beam remain proportional to each other, so that the exposure remains substantially constant. The beam 512″ exposes preselected portions of the composition to a substantially constant depth as described below.

For the purpose of this invention, the radiation beam 512″ may be not only a focused beam from a laser, but also light from any other light source, modified in a number of different ways. For example, it may be transmitted through any type of an exposure element, such as a variable optical density photomask, like a liquid crystal display, silver halide film, electro-deposited mask etc., or reflected off of any variable optical density device, such as a reflective liquid vector scanner, but any other type of scanner, such as a crystal cell. Also, the scanner may not only be a raster scanner, for example.

There is also provided a transparent plate or barrier 547 in contact with the composition 540, the barrier and the composition forming an interface 547″ coinciding with the internal surface of the plate or barrier. The barrier has also an external surface 547′, which is preferably parallel to the interface 547″. A platform 541 is also provided within the vessel, disposed under the plate 547. The platform 541 is supported on placement means 542 so that the platform may be lowered away from the late or barrier 547.

Simultaneously with the irradiation from the first exposure element 516, one of the above techniques described in the other embodiments may be used to provide an inhibition layer 549, necessary to avoid adhesion of any photohardened layer 511 to the transparent plate 547.

As shown in FIG. 4, communication lines 552, 550, 554, and 560, are also provided for the computer 534 to control the radiation source 510, the modulator 514, the first exposure element 516, and the placement means 542, respectively. An additional communication line 556 is provided for controlling any means which create the inhibition layer 549, as described in the aforementioned embodiments.

In operation of the preferred embodiment of this invention, the radiation means 510 provides a radiation beam 512 having an intensity as aforementioned. The radiation beam 512 passes through a modulator 514, where its intensity may be modulated from a zero intensity level to a maximum intensity level having a value less than that of the unmodulated beam intensity, due to energy losses. The modulated radiation beam 512′, having somewhat decreased intensity due to losses, passes in turn through the first exposure element 516 having a two-mirror 520 and 522 assembly, each mirror separately driven by a different motor 524 and 526, respectively. Mirror 520 deflects the beam in a X direction, while mirror 522 defects the beam in a Y direction, the X direction being perpendicular to the Y direction. Electrical feedback regarding the relative movements of the mirrors 520 and 522 is provided by the first exposure element 516 to the computer 534 through line 554. This feedback, being correlatable to the velocity and average residence time of the beam 512″ on the predetermined portions of the thin layer 548, is processed by the computer 534, and it is fed to the modulation means 514 as a control command through line 50 in order to modulate the intensity of the radiation beam 512, so that the product of the intensity of the beam 512″ and the average residence time at each position of the predetermined portions of the layer 548 remains substantially constant. Thus, the exposure level, being by definition the product of these two parameters, remains substantially constant. By maintaining the exposure level constant over the predetermined portions of each contiguous thin layer, the thickness of the layers is also kept substantially constant. This correction or compensation is very important, especially at unsupported portions of the thin layers, where swollen edges will appear as a result of overexposure due to the low initial velocity at the edges in vector scanning. The higher the intensity of the beam 512″, or the higher the photosensitivity of the photohardenable composition, the more severe this problem becomes in the absence of means to maintain the exposure level constant. Such exposure control is also necessary in raster scanning or in systems incorporating over scanned vector schemes, the difference being that the edges of the image may be underexposed due to lack of exposure contribution from adjacent non-exposed regions. In these cases, modulation means are utilized to ensure that edge regions of the image receive substantially the same exposure as non-edge regions. In any event, the radiation beam 512″ is controllably directed towards the photohardenable composition 540 through the transparent plate or barrier 547. During the photohardening step of a liquid layer 548 between the plate 547 and the platform 541 or a previously photohardened layer 511, an inhibition layer is formed as mentioned in the previous embodiments.

After the first layer has been photohardened in an imagewise pattern by exposure to actinic radiation provided by the first exposure element 516, the placement means 542 lowers the platform 541 by the thickness of a photohardened layer. The same steps are then repeated until the photohardened layers corresponding to all cross sectional sections of the three dimensional object have been fabricated, and the three dimensional product is complete.

The photohardenable compositions which can be used in the practice of the instant invention are any compositions which undergo solidification or photohardening under exposure to actinic radiation, and also comprise a latent inhibitor which does not appreciably absorb radiation and it is not activated at the wavelength of the radiation which is necessary to photoharden the composition. The latent inhibitor should absorb radiation and/or activate at a different wavelength than the wavelength suitable for photohardening. Preferably, the latent inhibitor should be reversible so that it may be deactivated when the source of activation is removed. This is important for the photohardenable composition not to be excessively enriched with the presence of unwanted active inhibitor in areas beyond the limits of the thin inhibition layer as already discussed.

Such compositions comprise usually but not necessarily a photosensitive material, usually referred to as a monomer, and a photoinitiator. The word "photo" is used here to denote not only light, but also any other type of actinic radiation which may transform a deformable composition, preferably a liquid, to a solid by exposure to such radiation. Cationic or anionic polymerization, as well as condensation and free radical polymerization and combinations thereof are examples of such behavior.

Cationic polymerization is preferable, and free radical polymerization even more preferable.

Monomers may be mono-, difunctional, trifunctional or multifunctional acrylates, methacrylates, vinyl, allyl, and the like. They may comprise other functional and/or photohardenable groups, such as epoxy, vinyl, isocyanate, urethane, and like, either by themselves if they are capable of rendering the monomer photohardenable, or in addition to acrylates or methacrylates. Examples of suitable ethylenically unsaturated monomers which can be used alone or in combination with other monomers include but are not limited to t-butyl acrylate and methacrylate, 1,5-pentanediol diacrylate and dimethacrylate, N,N-dimethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compound as disclosed in U.S. Pat. No. 3,380,831, 2,2-di(p-hydroxyphenyl)-propane diacrylate, pentaerythritol tetraacrylate and tetramethacrylate, 2,2-di-(p-hydroxphenyl)-propane dimethacrylate, triethylene glycol diacrylate, polyoxyethyl-2,2-di(p-hydroxyphenyl)propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxypropyl) ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Also included are all methacrylates, tetrahydro- furfuryl methacrylate, cyclohexyl methacrylate, diallylfumarate, n-benzylacrylate, carbowax 550 acrylate, methyl cellosolve acrylate, dicyclopentenyl acrylate, isodecyl acrylate, 2(2-ethoxyethoxy) ethylacrylate, polybutadiene diacrylate, tris (2-hydroxyethyl) iso cyanurate triacrylate, epoxy diacrylate tetrabromo bisphenol A diacrylate. Monomers with vinyl group like vinyl pyrol, N-vinyl pyrrolidone and vinyl ethers are usable. Also, oligomers with mono or multifunctional groups such as the ones with carbon group for alkali removability, and the ones with both acrylate and isocyanate end groups are useful. Particularly preferred monomers are polyoxyethylated trimethylolpropane triacrylate, ethylated pentaerythritol triacrylate, dipentaerythritol monohydroxypentaacrylate and 1,10-decanediol dimethylacrylate. Others are caprolactone acrylates and methacrylates, propoxylated neopentyl glycol diacrylates and methacrylates.

Di-(3-acryloxy-2-hydroxypropyl) ether of bisphenol A and Di-(3-methacryloxy-2-hydroxypropyl) ether of bisphenol A oligomers, generally referred to as unsaturated bisphenol A oligomers are of particular interest because they provide higher photospeed; also urethane diacrylates and methacrylates with aliphatic or aromatic backbones, referred to as unsaturated urethane oligomers are of particular interest, because they provide both higher photospeed and higher flexibility.

Monomers which expand on polymerization can be used in part with the standard monomers to achieve compositions giving no shrinkage or warpage upon exposure. These monomers are based on polycyclic ring opening mechanisms. Spiro orthocarbonates, spiroorthoesters and bicyclic ortho esters are known to belong to this class. Typical monomers are norborene spiro orthocarbonate, and bismethylene spiro orthocarbonate. Monomers which undergo cationic polymerization are also useful in this invention. Representative classes of monomers are cyclic ethers cyclic formals and acetals, lactones, vinyl monomers, sulfur containing monomers, organosilicone monomers, monofunctional epoxies, difunctional epoxies, epoxy prepolymers and higher oligomers and epoxy end-capped silicone resins. They can be found in the open literature. One such reference is "Photoinitiated cationic polymerization" by James V.

Crivello in "UV Curing: Science and Technology" edited by S. P. Pappas, published by Technology Marketing Corporation, 1978. Other ring opening monomers can be found in "Ring Opening Polymerization" Edited by K. J. Ivin and T. Saegusa, Elsevier Applied Science Publishers, London and New York, 1984.

In addition to the monomers and oligomers discussed above, photohardenable (photopolymerizable, photodimerizable and photocrosslinkable) polymeric materials may also be utilized within the spirit of this invention, either alone or preferably in combination with the monomers discussed previously. Such materials are given in "Light-Sensitive Systems" by J. Kosar, John Wiley and Sons, Inc., New York, 1965.

Photoinitiators are important ingredients in the present invention. They affect the photospeed, the spectral sensitivity region and, in part, the degree and the depth of polymerization or crosslinking of the photoformable composition. Other additives like sensitizers, chain transfer agents, etc. may also be included.

Photoinitiators for radical polymerization are extremely useful. They can be found in the open literature and as discussed in "UV Curing" under chapter "Photoinitiation of Radical Polymerization" by Pappas & McGinn as mentioned before, and U.S. Pat. Nos. 4,357,416 and 4,286,046. More than one initiator may be used.

Examples of photoinitiators which are useful in the present invention alone or in combination are described in U.S. Pat. No. 2,760,863 and include vicinal ketaldonyl alcohols such as benzoin, pivaloin, acyloin ethers, e.g., benzoin methyl and ethyl ethers, benzil dimethyl ketal; a-hydrocarbon-substituted aromatic acyloins, including a-methylbenzoin a-allylbenzoin and a-phenylbenzoin, others are 1-hydroxycyclobenzyl phenol ketone, diethoxyphenol acetophenone, 2-methyl-1-[4-(methyl thio)phenyl], 2-morpholino-propane-1, benzophenone, michler's ketone, substituted triphenyl imidazolyl dimers with chain transfer agent camphoquinone etc. Photoreducible dyes and reducing agents disclosed in U.S. Pat. Nos. 2,850,445, 2,875,047, 3,097,097, 3,074,974, 3,097,097 and 3,145,104, as well as dyes of the phenazine, oxazine, and quinone classes, Michler's ketone benzophenone, acryloxy benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators and photoinhibitors are sensitizers disclosed in U.S. Pat. No. 4,162,162. The photoinitiator or photoinitiator system is present in 0.05 to 10% by weight based on the total weight of the photoformable composition. Other suitable photoinitiation systems which are thermally inactive but which generate free radicals upon exposure to actinic light at or below 185° C. include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tert-butylanthraquinone, octamethylanthraquinone, 1,4-naphthoquinone, 9,10-phenanthraquinone, benz(a)anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione. Also, alpha amino aromatic ketones, halogenated compounds like Trichloromethyl substituted cyclohexadienones and triazines or chlorinated acetophenone derivatives, thioxanthones in presences or tertiary amines, and titanocenes.

Typical classes of initiators for cationic polymerization are aryldiazonium salts, diaryliodonium salts comprising nonnucleophilic counterions such as $SbF_6^-$, $BF_4^-$, $PF_6^-$, $ClO_4^-$, $CF_3SO_3^-$, $AsF_6^-$, triacylsulfonium salts, triarylselenium salts or Iron arene complex. Examples of these include but are not limited to 2,5-diethoxy-4-(p-tolylmercapto) benzene diazonium PF6-, 4-dimethylamine-naphthalene diazonium PF6-, diphenyliodonium hexafluoroarsenate, di-t-butyldiphenyliodonium hexafluorophosphate FX-512 sulfonium salt (by 3M Company), triethylsulfonium iodide, CG24-61 (by Ciba Geigy). One good reference book is Photoinitiation of Cationic Polymerization mentioned earlier.

Sensitizers useful with these photoinitiators for radical polymerization include but are not limited to methylene blue and those disclosed in U.S. Pat. Nos. 3,554,753; 3,563,750; 3,563,751; 3,647,467; 3,652,275; 4,162,162; 4,268,667; 4,351,893; 4,454,218; 4,535,052; and 4,565,769. A preferred group of sensitizers include the bis(p-dialkylaminobenzylidine) ketones disclosed in Baum et al., U.S. Pat. No. 3,652,275 and the arylidene aryl ketones disclosed in Dueber, U.S. Pat. No. 4,162,162, as well as in U.S. Pat. Nos. 4,268,667 and 4,351,893. Useful sensitizers are also listed in Dueber, U.S. Pat. No. 4,162,162 column 6, line 1 to line 65. Particularly preferred sensitizers include the following: DBC, i.e., cyclopentanone; 2,5-bis-[4-(diethylamino)-2-methylphenyl]methylene]-; DEAW, i.e., cyclopentanone, 2,5-bis[4-(diethylamino)phenyl]methylene]-; dimethoxy-JDI, i.e., 1H-inden-1-one, 2,3-dihydro-5,6-dimethoxy-2-[(2,3,6,7-tetrahydro-1H,5H-benzo[i,j-]quinolizin-9-yl)methylene]-, and JAW, i.e., cyclopentanone, 2,5-bis[(2,3,6,7-tetrahydro-1H,5H-benzo[i,j-]quinolizin-1-yl)methylene]-. Also useful are cyclopentanone 2,5-bis[2-(1,3-dihydro-1,3,3-trimethyl-2H-indol-2-ylidene)ethylidene], CAS 27713-85-5; and cylopentanone, 2,5-bis-[2-ethylnaphto[1,2-d]thiazol-2-(1H)-ylidene)ethylidene], CAS 27714-25-6.

Sensitizers for cationic polymerization include but are not limited to perylene, acridine orange, acridine yellow, phosphene R, benzoflavin & Setoflavin T.

Hydrogen donor compounds useful as chain transfer agents in the photopolymer compositions include: 2-mercaptobenzoxazole, 2-mercapto-benzothiazole, 4-methyl-4H-1,2,4,triazole-3-thiol, and the like; as well as various types of compounds, e.g., (a) ethers, (b) esters, (c) alcohols, (d) compounds containing allylic or benzylic hydrogen cumene, (e) acetals, (f) aldehydes, and (g) amides as disclosed in column 12, lines 18 to 58 of MacLachlan, U.S. Pat. No. 3,390,996.

Although the preferred mechanism of photoforming is free radical polymerization, other mechanisms of photoforming apply also within the realm of this invention. Such other mechanisms include but are not limited to cationic polymerization, anionic polymerization, condensation polymerization, addition polymerization, and the like, as well as combination thereof.

Good examples of latent inhibitors according to this invention are compounds containing dinitroso groups, which are not free-radical polymerization inhibitors, but are photochemically converted to inhibitors of free-radicals polymerization by exposure to ultraviolet radiation having appropriate wavelengths. The specific wavelengths which effect conversion of the dinitroso compound depend on the particular dinitroso compound involved. Generally, the wavelengths which cause this result are less than about 340 nanometers. In the case of certain aromatic dinitroso compounds, this region may be extended to wavelengths up to about 380 nanometers. Examples of reversible inhibitors are described in U.S. Pat. Nos. 3,885,964 (Nacci), 4,029,505 (Nebe), and 4,050,942 (Nacci), among others.

Although the nature of the inhibitor formed by the photochemical conversion of the dinitroso compound is not in all cases fully understood, it is believed to be a nitroso monomer, a nitroxide or nitric oxide. Most commonly, the dinitroso compound is in thermal equilibrium with a mononitroso compound. The dinitroso compounds which are subject to this equilibrium are referred to herein as "nitroso dimers" and the equilibrium mononitroso compounds are referred to as "nitroso monomers". Thus, the nitroso dimer is converted to the nitroso monomer by ultraviolet radiation, or thermally, or by a combination thereof.

In those cases where the inhibiting species is nitroso monomer, it is believed that the nitroso monomer reacts with free-radicals or the photoactivated nitroso monomer to form stable nitroxide radicals which do not propagate the free-radical chain process and hence serve as efficient chain terminators, The processes believed to be operating are outlined in equations 1-3, wherein

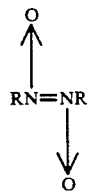

represents a typical nitroso dimer and RNO* represents a photoexcited nitroso monomer species

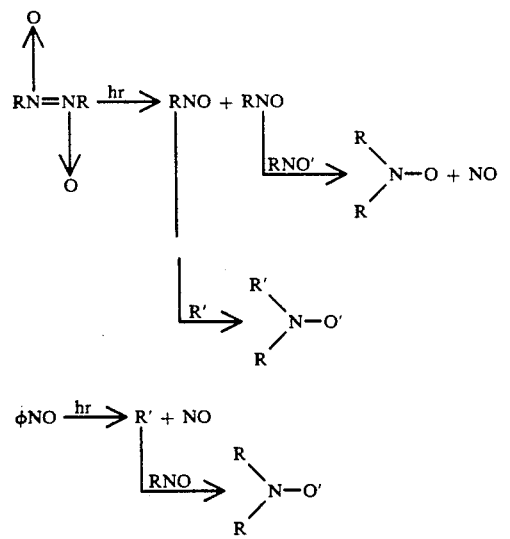

(1)

(2)

(3)

Thus, upon generation of free radicals in the areas struck by the imagewise radiation, the inhibitor species react with at least some of the free radicals to form inhibiting nitroxide radicals and polymerization does not take place in the areas at which the latent inhibitor is activated by radiation of the appropriate wavelength.

If the inhibitor is in high enough concentration to limit penetration of the radiation which activates the inhibitor, the lower portions of the photohardenable composition not exposed to such radiation, but being exposed to actinic radiation which only activates the photoinitiator, become subject to photohardening, since the photoinitiator system operates in a normal manner to produce initiating radicals. These radicals are then free and able to effect chain propagation in the usual way, so that polymerization and photohardening may occur.

The dinitroso group can be of the structure

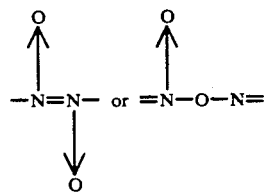

The structure of the remainder of the compounds is not important provided it does not contain groups which inhibit free-radical polymerization. The actual form of the dinitroso group of the structure

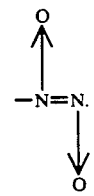

whether cis or trans, is immaterial, but the form is believed to be mainly trans except when constructed to the cis form by a ring structure.

Most commonly, the dinitroso compound is a nitroso dimer which is in thermal equilibrium with a nitroso monomer. These nitroso dimers generally have a dissociation constant of about $10^{-3}-10^{-10}$ and a dissociation half-life of at least about 30 seconds in solution at 25° C. The dissociation half-life of the dimer can be determined using known techniques, for example, by measuring the rate of colored nitroso monomer formation by visible spectroscopy.

A typical nitroso dimer of the first structure photodissociates in accordance with the equation:

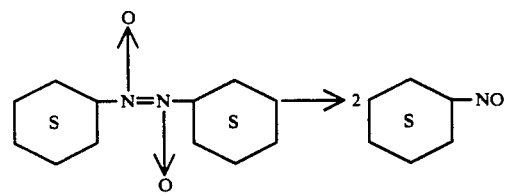

The nitroso monomer may contain one or more nitroso groups. When the nitroso monomer contains two or more nitroso groups, the associated of the nitroso in the nitroso dimer may be intramolecular rather intermolecular. A typical nitroso dimer of the first structure in which the association of the nitroso groups is intramolecular photodissociates in accordance with the equation:

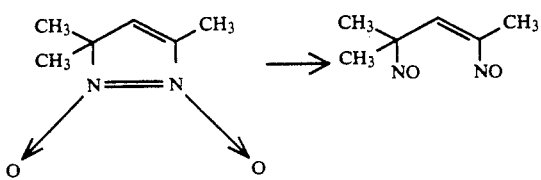

A typical nitroso dimer of the second structure photodissociates in accordance with equation:

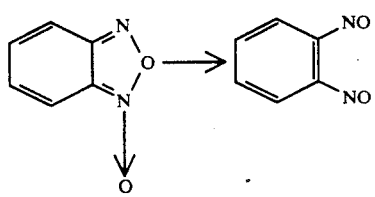

The most preferable nitroso compounds are the ones which are substantially dimeric at room temperature, such as tertiary C—NO compounds with cyclic structure, or secondary C—NO compounds.

The dinitroso compound is ordinarily employed in concentrations of about 0.1–10% by weight based on the dry photopolymerizable composition. The preferred amount in any specific case will depend upon the particular unsaturated compound/free-radical generating system employed and whether it is a simple system, a binder system, or an essentially crystalline system. In general, the preferred amount of dinitroso compound will be about 0.2–6% by weight based on the photopolymerizable composition.

As is known from the work of Donaruma, J. Org. Chem., 23, 1338 (1958), applied to nitrosocyclohexane dimer, isomerization of nitroso dimers to oximes is catalyzed by acids and bases. When components containing basic amino groups are present in the photopolymerizable composition, it may be necessary to add a suitable acid in an amount sufficient to neutralize all or a portion of these amino groups in order to obtain compositions which have good shelf stability.

Examples of suitable dinitroso compounds include:

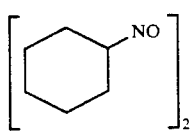

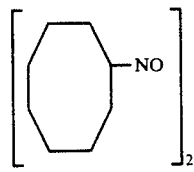

$(n-C_3H_7CH(NO)C_3H_7)_2$

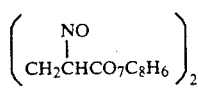

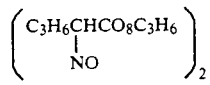

$((CH_3)_2CHNO)_2$ $(n-C_3H_7CH(NO)CO_2C_3H_5)_2$
$((CH_3)_2CHCH_2CH_2CH(NO)CO_3C_3H_5)_2$
$(C_3H_6O_7CCH_3CH(NO)CO_3C_2H_5)_2$ $(CH_2CH(NO)C_3H_6)_2$

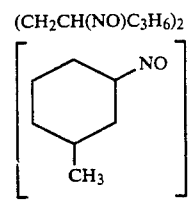

$(CH_3COCH(CO_3C_3H_6)CH(NO)CO_3C_3H_6)_2$ $((CH_3)_2CHCH(NO)CH_3)_2$ $(CH_2COCH(NO)COC_6H_8)_3$
$(C_3H_5COCH(NO)COC_3H_5)_2$
$(p-CH_3OC_3H_6COCH(NO)COC_3H_5)_2$

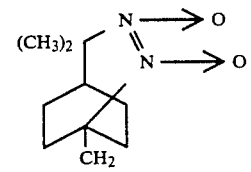

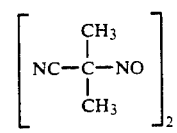

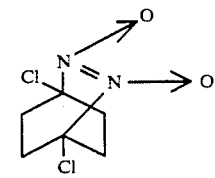

-continued
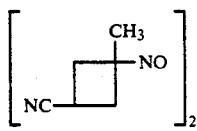
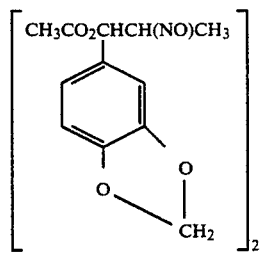
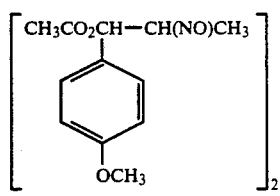
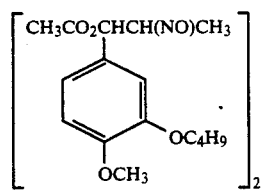
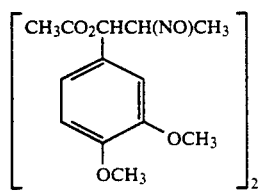
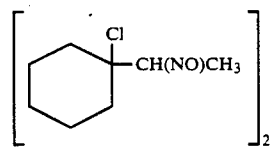
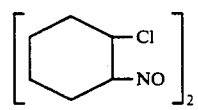
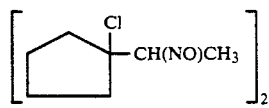
(n-C₃H₅CH(NO)CH₃CH₃CH₃OH)₂
(n-C₆H₁₃CH(NO)CH₃)₂
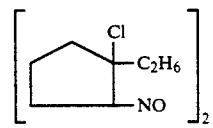
(CH₃CH(NO)Cl)₃
(HO(CH₃)₂NO)₃
((CH₃)₂CCH₃CH(NO)C(CH₃)₂ONO₂)₃
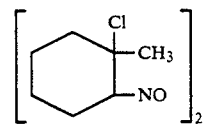
(CH₃CH(Cl)CH(NO)CH₃)₂
(CH₃CH(Cl)CH(NO)C₃H₅)₂
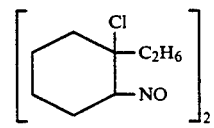
(C₃H₅CH(Cl)CH(NO)CH₃)₂
((CH₃)₂C(Cl)CH(NO)CH₃)₂
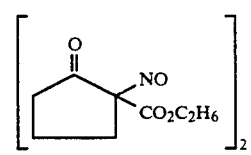
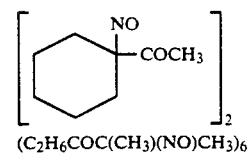
(C₂H₆COC(CH₃)(NO)CH₃)₆

-continued
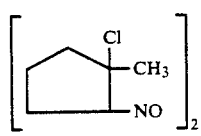
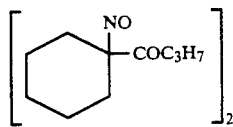
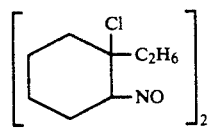
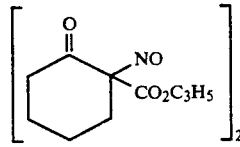
((CH₃)₂CHCOC(CH₃)(NO)CH₃)₂
(CH₃COC(CH₃)(NO)CH₃)₂
((CH₃)₂CHCH₃COC(CH₃)(NO)CH₃)₂
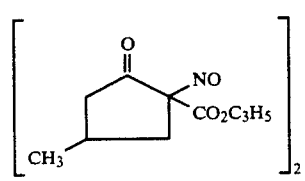
(l(CH₃)₂Cl₃CHNO)₂
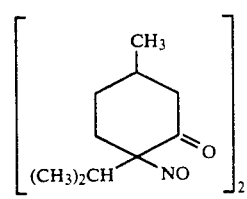
(C₂H₅COC(CH₃)(NO)CO₃C₃H₅)₂
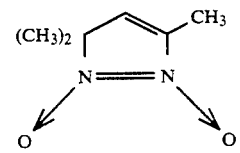
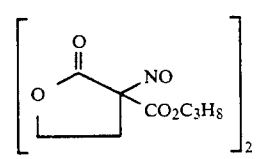
(CH₃NO)₂
(CH₃C(CH(CH₂)₃)₇CH₃NO)₂
(CH₃(CH₃)₁₀CH₃NO)₂
(CH₃(CH₃)₁₀CH₃NO)₂
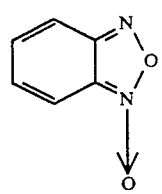
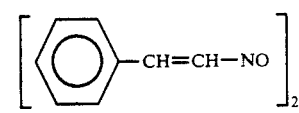
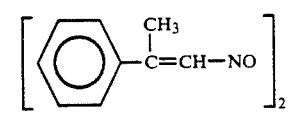
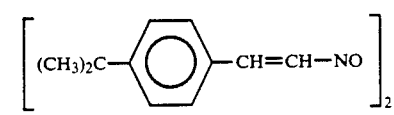
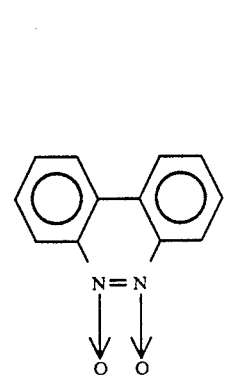

-continued
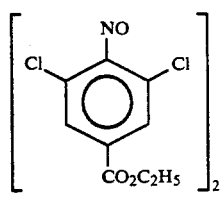 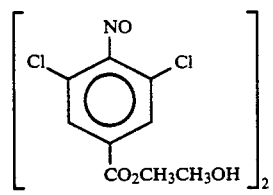
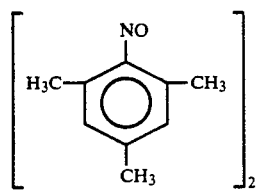 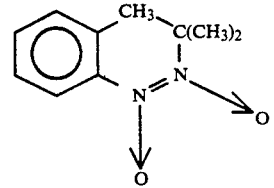
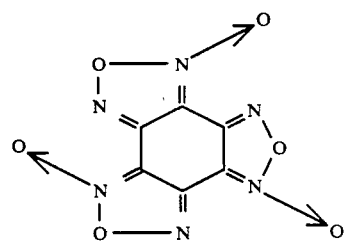
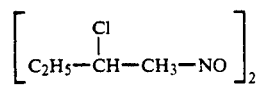 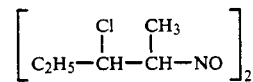
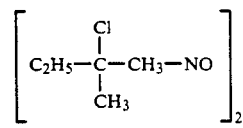 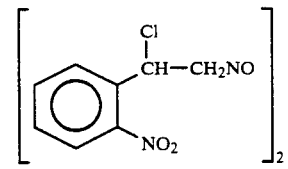
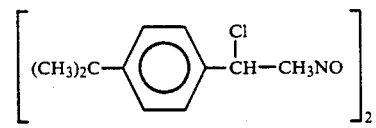
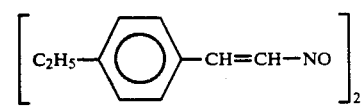 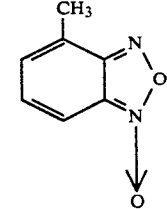
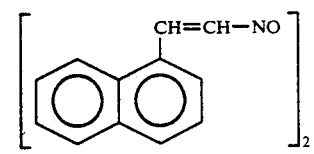

-continued
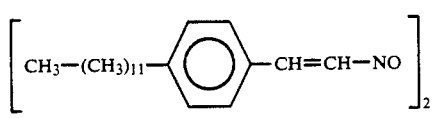 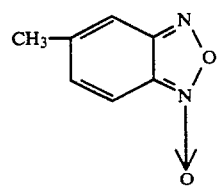
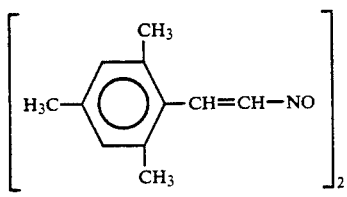
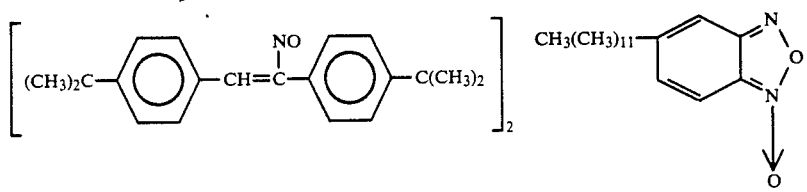
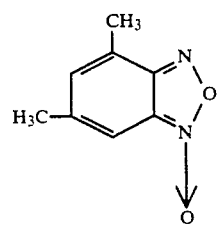
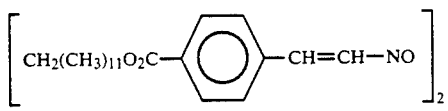
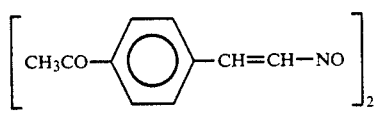
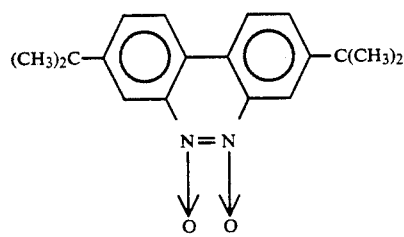 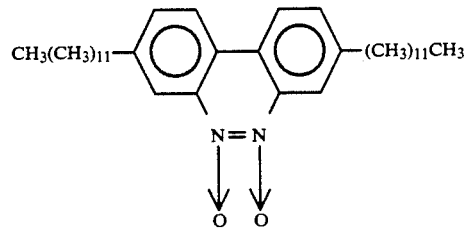
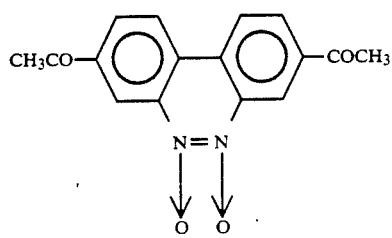 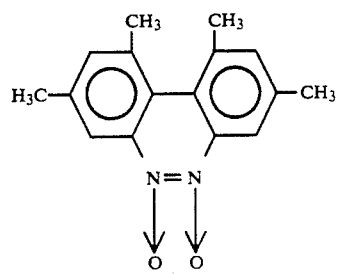

-continued
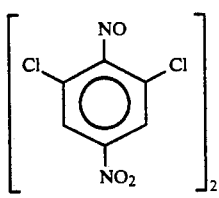 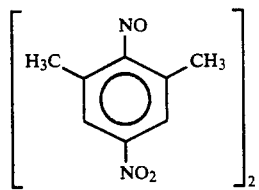
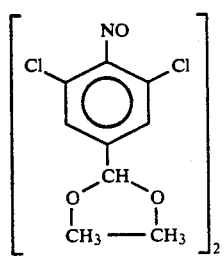 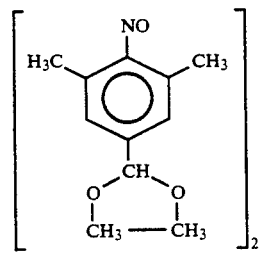
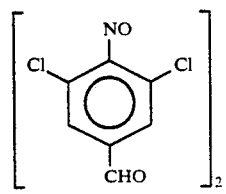 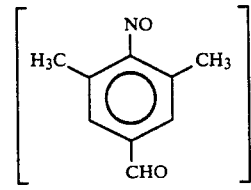
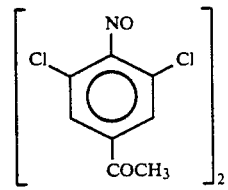 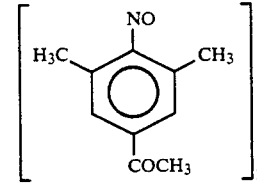
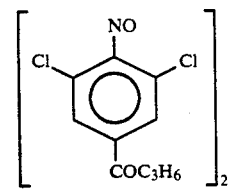 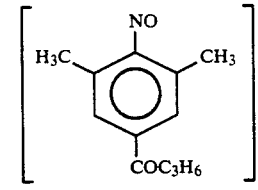
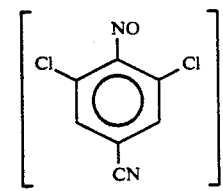 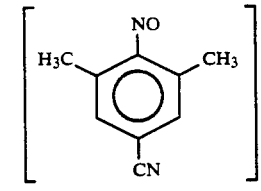
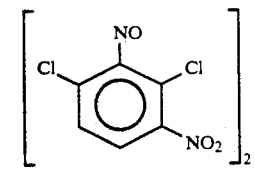 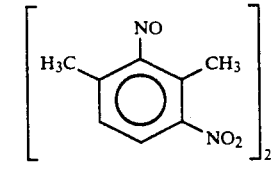

-continued

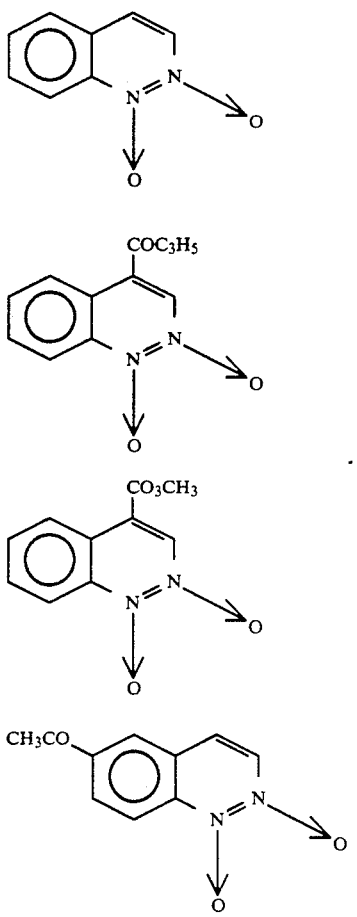

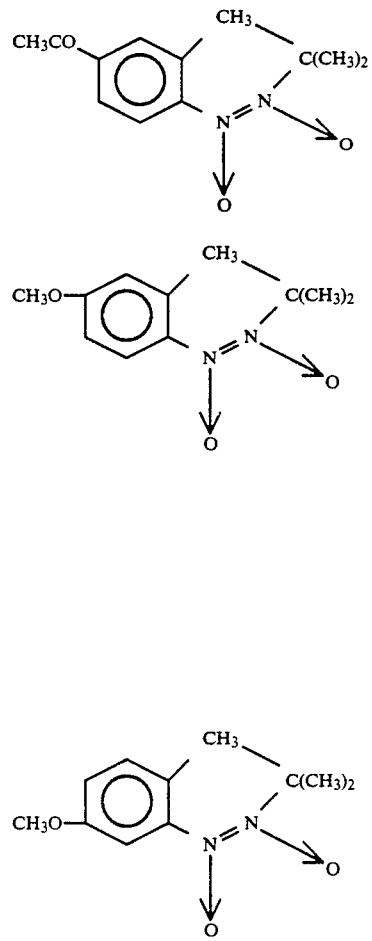

Other components may also be present in the photoformable thermally coalescible compositions, e.g., dyes, pigments, extenders, organic or inorganic fillers, organic or inorganic reinforcement fibers, polymerization inhibitors, thermal stabilizers, viscosity modifiers, interlayer and generally interfacial adhesion promoters, such as organosilane coupling agents, coating aids, etc., so long as the photoformable compositions retain their essential properties.

Reinforcement fibers, such as glass, polyester, polyamid, polyimide, polytetrafluoroethylene, and the like at different fiber lengths are very useful for further improvement in physical strength.

EXAMPLE

The Following composition was made:

| Plex 6696* | 94.7 g |
|---|---|
| Nitroso compound** | 5.0 |
| Irgacure 651*** | 0.3 |

*Trimethylolpropane triacrylate derived oligomer
**2,3-diaza-1,4,4-trimethylbicyclo[3.2.1]oct-2-ene-N,N-dioxide
***2,2-dimethoxy 2-phenylacetophenone The above composition was placed between two quartz slides spaced at a distance of 1 mm from each other, and it was exposed from one of the slides (window slide) to the full spectrum of a Xe lamp, while the other one was used as a support slide. The exposure was adequate to photoharden the composition sufficiently to adhere well to the support slide. Very low adhesion (about zero) of the photohardened composition was observed on the window slide, and the separation was extremely easy. A second, third, and so on layers of composition placed between the previously photohardened layer and the window slide behave in a similar manner. In other words, they adhere well to the previously photohardened layer, but not to the window slide.

This is because the radiation spectrum of the Xe lamp is rather flat in the near UV region of 300 to 400 nanometers, and thus it contains both the wavelength needed to activate the nitroso-compound (in the vicinity of 320 nanometers) in a thin layer at the interface of the composition and the window slide, as well as the wavelength needed (in the vicinity of 370 nanometers) to initiate and propagate the polymerization or photohardening in depth, at least as far as this example is concerned.

Examples demonstrating the operation of the instant invention have been given for illustration purposes only, and should not be construed as restricting the scope or limits of this invention in any way.

What is claimed is:

1. In an apparatus for fabricating a film of photohardened composition including a first source of actinic radiation for exposing a layer of photohardenable composition to induce photohardening of the composition layer, and a barrier transparent to the radiation having a surface to be positioned in contact with the composition to form an interface therewith, the improvement in the apparatus comprising a second source of actinic radiation for activating an inhibitor of photohardening contained in the composition to create an inhibition layer in contact with the interface that inhibits photohardening of the composition within the inhibition layer during exposure from said first radiation source, thereby precluding adhesion of any photohardened composition to the barrier.

2. An apparatus for fabricating a film from a photohardenable composition comprising:

- a first source of actinic radiation for exposing a layer of the photohardenable composition to induce photohardening of the composition layer in order to form the film;
- a transparent barrier having two opposite surfaces, one of the surface to be positioned in contact with the composition and to form an interface therewith, the other surface being disposed in a way to remain unwetted by the composition; and
- a second source of actinic radiation for activating an inhibitor of photohardening contained in the composition to create an inhibition layer in contact with the interface that inhibits photohardening of the composition within the inhibition layer during exposure from said first radiation source, thereby precluding adhesion of any film to the barrier.

3. An apparatus as defined in claim 1 or 2, further comprising means for moving the film away from the interface in a direction orthogonal thereto in order to form a new layer of photohardenable composition adjacent to the interface.

4. An apparatus as defined in claim 3, further comprising a vessel for containing the photohardenable composition, and wherein the moving means comprises a movable platform disposed within the composition upon which the photohardened material is supported.

5. An apparatus as defined in claim 1 or 2, wherein the inhibitor of photohardening is a nitroso-dimer.

6. An apparatus as defined in claim 5, wherein the nitroso dimer is 2,3-diaza-1,4,4-trimethylbicyclo[3.2.1]oct-2-ene-N,N-dioxide.

* * * * *